US012743122B2

(12) United States Patent
So et al.

(10) Patent No.: US 12,743,122 B2
(45) Date of Patent: Sep. 22, 2026

(54) CIRCUITRY AND METHOD FOR QUANTIZATION ERROR CORRECTION FOR TIME SYNCHRONIZATION

(71) Applicant: Advanced Micro Devices, Inc., Santa Clara, CA (US)

(72) Inventors: Ming So, Santa Clara, CA (US); Jian Liu, Beijing (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 158 days.

(21) Appl. No.: 18/395,958

(22) Filed: Dec. 26, 2023

(65) Prior Publication Data

US 2025/0208647 A1 Jun. 26, 2025

(51) Int. Cl.
*G06F 1/12* (2006.01)
*G06F 1/08* (2006.01)
*H04J 3/06* (2006.01)

(52) U.S. Cl.
CPC .................. *G06F 1/12* (2013.01); *G06F 1/08* (2013.01); *H04J 3/0667* (2013.01)

(58) Field of Classification Search
CPC .......................................................... G06F 1/12
See application file for complete search history.

(56) References Cited

U.S. PATENT DOCUMENTS 6,943,609 B2 * 9/2005 Zampetti ............... H04J 3/0688 370/503
6,993,102 B2 1/2006 Spence et al.
7,352,748 B1 * 4/2008 Rozario .................. H04L 45/60 370/392
9,432,456 B2 8/2016 Stanton et al.
10,048,720 B2 8/2018 Yu et al.
11,687,115 B2 6/2023 Finan et al.
11,720,520 B2 8/2023 Kelm et al.
12,222,750 B2 * 2/2025 Bordogna ............... G06F 9/542
2005/0259754 A1 * 11/2005 Ho ..................... H04N 21/8547 375/240.26
2007/0296864 A1 * 12/2007 Kim ................. H04N 21/47214 348/E5.005
2008/0307075 A1 * 12/2008 Urano ........................ G06F 1/14 709/220
2014/0298070 A1 * 10/2014 Kim ...................... H04J 3/0697 713/375
2021/0223816 A1 * 7/2021 Liu ........................... G06F 1/08
2022/0045777 A1 2/2022 Amicangioli et al.
2022/0337683 A1 * 10/2022 Biederman ............. H04L 69/28

FOREIGN PATENT DOCUMENTS

CN 112887046 B * 4/2022 ............ H04J 3/0667

OTHER PUBLICATIONS

USB 3.0 Promoter Group, "Universal Serial Bus 4 (USB4tm) Specification," Version 1.0, Aug. 2019, 31 pages.

* cited by examiner

*Primary Examiner* — Phil K Nguyen
(74) *Attorney, Agent, or Firm* — Slater Matsil, LLP

(57) ABSTRACT

A method of operating an electronic device is disclosed. The method includes generating an initial time value, generating an initial time stamp based on the initial time value, and transmitting the initial time stamp. The initial time stamp has a number of bits. For a set period of time, the time stamp is updated and the updated time stamp is transmitted from the electronic device. After the set period of time, the time stamp is adjusted by a residual time amount and the adjusted time stamp is transmitted from the electronic device. Other implementations are disclosed.

20 Claims, 5 Drawing Sheets

CIRCUITRY AND METHOD FOR QUANTIZATION ERROR CORRECTION FOR TIME SYNCHRONIZATION

BACKGROUND

It is common to have systems with multiple electronic devices that are interconnected. In some cases, it is desirable for the different devices to operate based on a common clock. For example, the host (or master) may operate based on a main clock, which is then shared with the targets (or slaves). One way to implement this synchronization is for the host to provide clock information to the targets.

Universal Serial Bus (USB) standard is an industry standard that specifies the physical interfaces and protocols for connecting, data transferring, and powering of hosts (e.g., personal computers), peripherals (e.g., keyboards and mobile devices), and intermediate hubs. USB was designed to standardize the connection of peripherals to computers, replacing various interfaces such as serial ports, parallel ports, and game ports. The USB connection has become commonplace on a wide range of devices, such as keyboards, mice, cameras, printers, scanners, flash drives, smartphones, game consoles, and power banks.

Multiple generations of USB specifications have been developed over the years. With each newer generation of the USB specification, the USB standard supports a higher data rate. Generally, newer generations of USB systems support multiple operation modes or data rates and are backward compatible with older generations of systems. Due to the multiple modes and data rates supported by different USB systems, interoperability between USB systems with different capabilities still poses a technical challenge.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
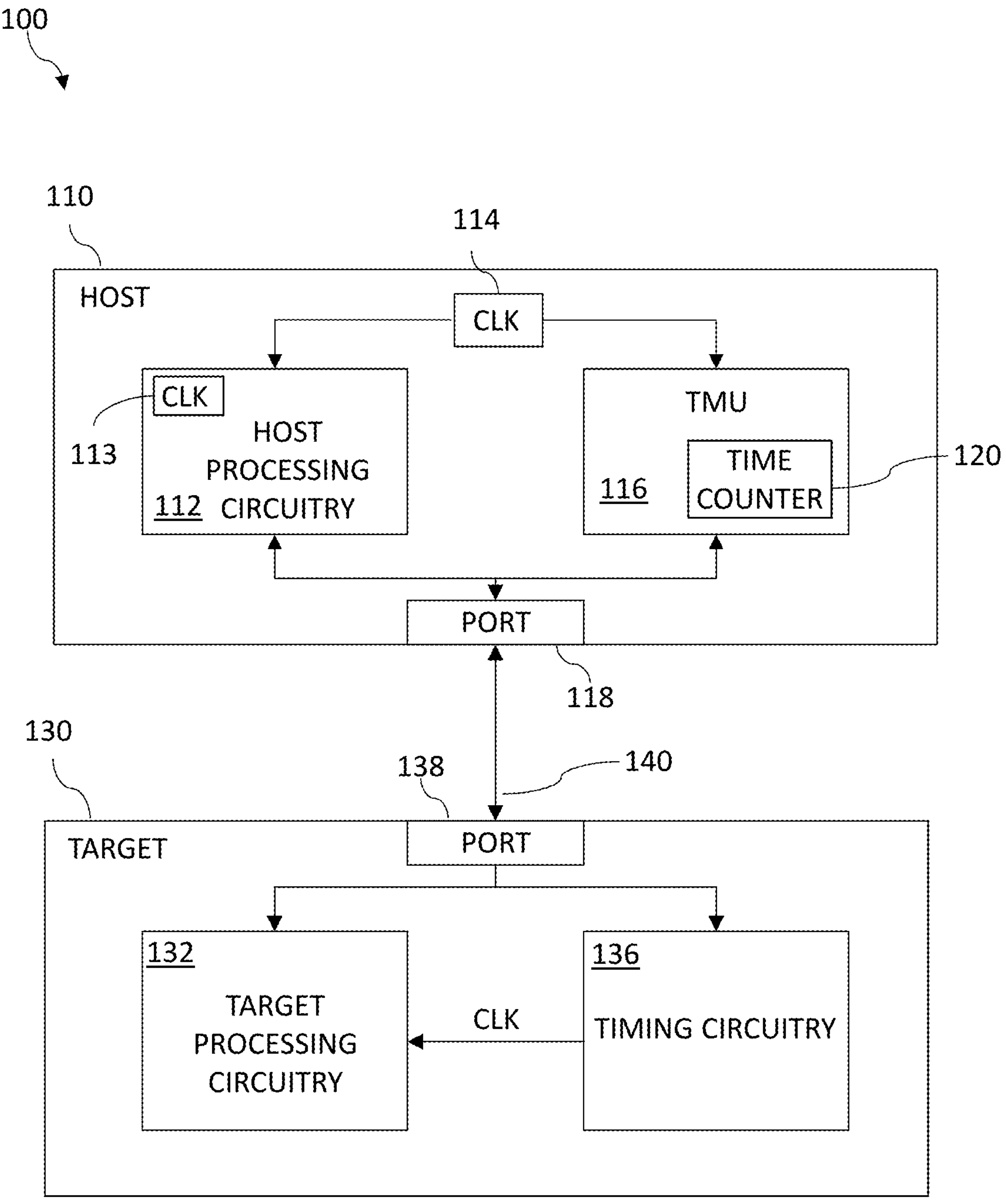
FIG. 1 is a block diagram of an implementation of a system of the invention.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component or signal.

FIG. 1 shows a multi-device system 100 that can utilize aspects of the invention. The system 100 includes a host device (or simply host) 110 and a target device (or simply target) 130. The host 110 includes a host processing circuitry 112, a host main clock 114, a host time management unit (TMU) 116, and a host port 118. Similarly, the target 130 includes a target processing circuitry 132, target timing circuitry 136, and a target port 138. While illustrated differently, it is understood that the device 110 and device 130 can each operate as a host in some implementations and as a target in other implementations. In other words, a particular device might be designed to operate as either a host, a target, or both.

The system 100 can be any multi-device system that is designed with devices that operate synchronously. For example, the host 110 may be, e.g., a computer, an image projector system, an electronic display, an electronic laboratory equipment, or similar, while the target 130 may be, e.g., a computer, a USB storage device, a digital camera, or similar. Many other examples exist.

In FIG. 1, the functional circuitry of the host device (or simply host) 110 is illustrated by the block labeled host processing circuitry 112. This circuitry might typically include a processor coupled to memory to execute instructions that perform the functions of the device. The invention, however, is not limited to this configuration. The host processing circuitry 112 can include any circuitry-analog, digital, or mixed signal.

In one implementation, the host device 110 can be a system on chip (SOC) device, e.g., an integrated circuit that integrates most or all components of a computer or other electronic system. For example, the SOC can include one or more central processing units (CPUs), one or more graphics processors, and/or one or more secure processors. The device 110 can also include a number of input/outputs. In various implementations the I/O's can support memories (e.g., hard disk drive, SD card, flash), displays (e.g., PCI), and/or busses (e.g., USB, USB 2, USB 3, USB 4).

In the illustrated implementation, the host device 110 operates synchronously as illustrated by the main clock 114. This clock 114 may feed other clocks, such as clock 113 of the host processing circuitry 112. For the purpose of this discussion, the clock 114 is a clock that provides timing information to the time management unit 120, which in turn provides timing information of the target device 130 of the system 100. It is understood that the clock 113 and clock 114 may, in fact, be a single clock. System time can be tracked using the clock 114, e.g., with a counter for keeping track of time durations.

The time management unit 116 keeps track of the system time and shares the time with other devices in the system. As will be discussed in greater detail below, in various implementations of the invention the time management unit 116 can maintain a clock with a greater accuracy than known implementations.

The target 130 includes target processing circuitry 132. This circuitry performs the functions of the target device 130. These functions can be based on data received from the host 110 via connection 140 or a different channel (that is not illustrated). For example, circuitry 132 might include a processor coupled to memory to execute instructions but can alternatively, or additionally, include any circuitry-analog, digital, or mixed signal. The circuitry can be used to implement, for example, a display monitor, a docking station, a storage unit, measurement equipment or another computer.

The target timing circuitry 136 receives the time information from host TMU 116 and implements the timing mechanism for the target device 130. The target device is configured to operate synchronously based on the clock signal CLK. An absolute time of the host 110 can be maintained by the target timing circuitry 136.

FIG. 1 also shows that the devices 110 and 130 are coupled together by a connection 140 that provides a communication path between host port 118 and target port 130. The connection might be a cable or a wired connection, e.g., on a printed circuit board. Any protocol with a shared clock can utilize the implementation discussed with respect to this figure. In one or more implementations, the host port 118 and the target port 138 can be connected by a USB-USB bridge cable 140. In another implementation, the host port 118 and the target port 138 may be connected directly.

In the implementation of FIG. 1, the devices 110 and 130 operate with respect to a common timing. The clock value is determined in host device 110 and communicated to target device 130 by a protocol that utilizes the time management unit 116 of the host device 110.

Figure 2:
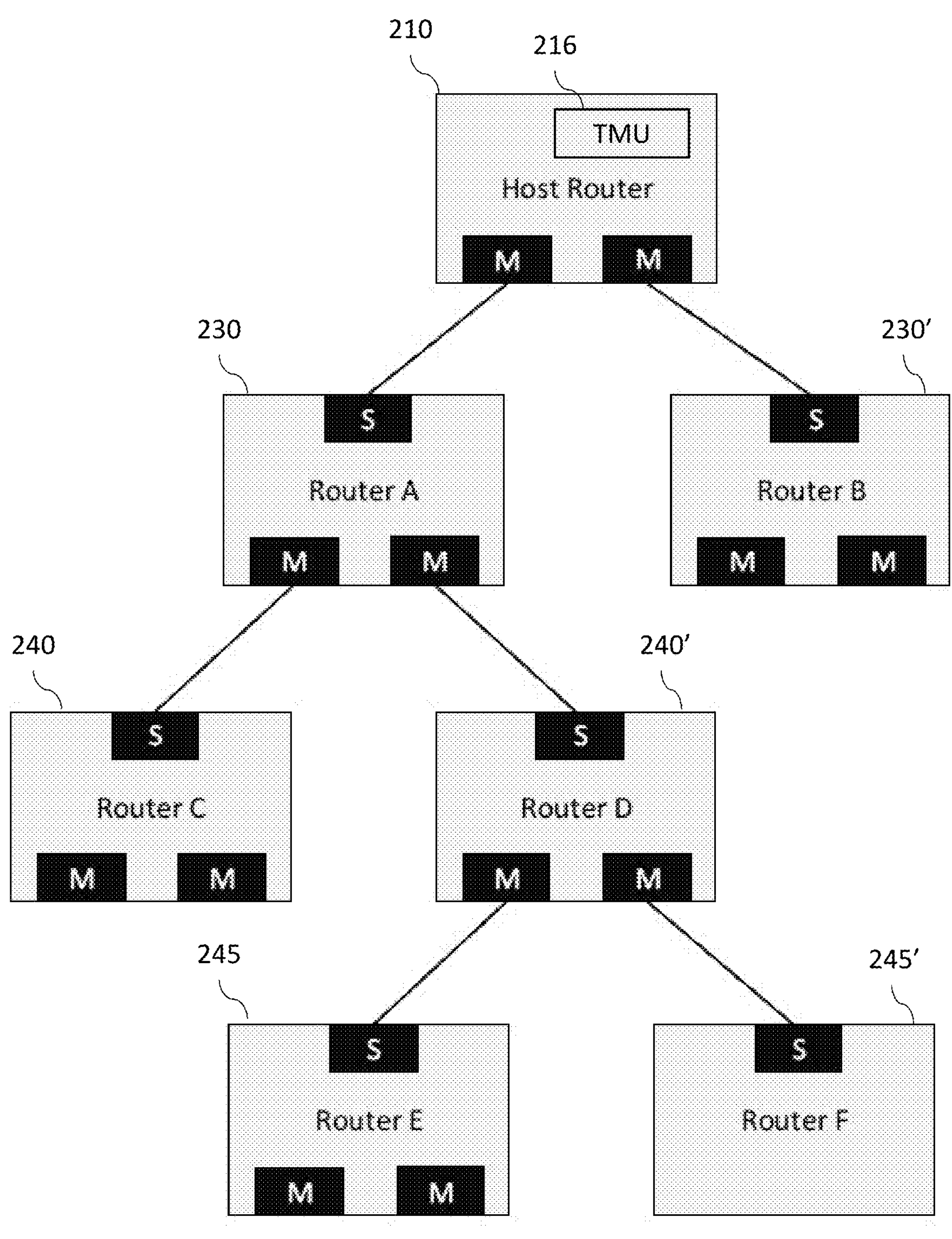
FIG. 2 is a block diagram of a USB 4 implementation of a system of the invention.

An example of the communication will be discussed with respect to a USB standard (i.e., any communication that is compatible with a USB standard existing at the effective filing date), e.g., the USB4 standard. An example of such a system is illustrated by FIG. 2, which is compatible with the USB4 In this particular example, the system is unchanged except for the use of a modified time management unit 216 in the host router 210. As shown in FIG. 2, the host 210 may communicate directly with multiple targets 230, 230', which in turn communicate directly and indirectly with targets 240, 240', 245, and 245'. (In FIG. 2, the "M" stands for master and the "S" stands for slave.)

While discussed herein with respect to USB 4, it is understood that other protocols can also use the concepts discussed herein. For example, protocols such as PCIe Precision Time Measurement (PTM) and Ethernet Precision Time Protocol (PTP, IEEE 1588) could utilize the time synchronization techniques discussed herein.

For example, in the USB4 time synchronization protocol, the clock is shared as an 80-bit value, with the upper 64-bits being the integer portion of time in nanoseconds and the lower 16-bits being the fractional field. In one non-limiting example, the value is stored in the TMU time counter 120 of time management unit 116 and periodically shared with the target device 130.

In one or more implementations, the host 110 and the target 130 may perform a perpetual time stamp handshake mechanism for the target 130 to determine the absolute time of the host 110. The target timing circuitry 136 is configured to receive a time stamp from the host TMU time counter 120. The host 110 and the target 130 will increment its own time value at every clock tick or clock cycle.

A specific example of a timing issue will be discussed to explain concepts that can be generalized to other situations. In this example, the host 110 may start its time stamp slightly earlier than the target 130 resulting in an offset. For example, the host 110 and the target 130, may exchange time synchronous handshakes every 16 μs. The host 110 and the target 130 may run on two separate clocks with different tolerances. For example, the host 110 may run at 125 MHz and the target 130 may run at 200 MHz. At these frequencies, the host 110 may increment its time every 8 ns and the target 130 may increment its time every 5 ns. When the target 130 reaches its clock at 115 ns, the host 110 is approximately at 130 ns. With the time synchronization handshakes, the target 130 can calculate a local time at the host TMU clock 116 adjust the time accordingly.

Implementations of the invention can provide further accuracy with the time synchronization handshakes generated at the host 110. An issue can occur when the host processing circuitry 112, e.g., the operating system (OS) at the host side, is using a different clock 113 as the absolute time. In the example of FIG. 1, the clock 113 and the clock used by the time management unit 116 (USB4 controller) are derived from the same source 114 and are in sync.

An issue can occur because the TMU time counter 120 is updated by adding one clock period on every clock tick while the time tracked by the operating system is increased in integer numbers. For example, with 8 ns periods the time counter 120 will count as is 0.0000, 8.0000, 16.0000, 24.0000, etc. The host processor clock 113, on the other hand, increments its time in integer numbers, for example, 0, 1, 2, 3, 4, etc. Software operating within the host processing circuitry translates the number of clock ticks into a time by multiplying by the clock period (e.g., number_of_clock_tick*clock_period). When the decimal portion is not completely contained within the 16 bits, there will be a finite truncation error.

For example, a clock frequency of 224.66667 MHZ (a base clock of 674 MHz divided by 3) will have a clock period of 4.4510385756 nanoseconds. When this value is translated into an 80-bit value with 16 bits for decimal, it becomes 0x0000_0000_0000_0004_7377. In translating it back to decimal value, the actual time becomes 4.451034546 ns with a truncation error of 0.000004029769 ns in every clock tick. In this particular example, when the host processing circuitry 113 time is at 2:00:00 or 2*60*60 or 7200 seconds, the TMU time counter 120 is 2*60*60*(4.451034546/4.4510385756) or 7199.99343 seconds, which is 6.5 ms behind the correct time in the host 110. In essence, this makes the TMU time counter 120 to be running slightly slower than the time seen by the host processing circuitry 112. While the error is small for short periods of time, the error can accumulate to a significant time difference depending on the application and how long it is running.

To illustrate this point, an example can be considered where the host node 110 is sending video/audio stream to the target node 130. Target node 130 will use its own local time to calculate the host time in order to stream the video/audio, which is being controlled by the OS in the host node 110. Over a long period of streaming, the time drift error will become increasingly larger. In typical video/audio application, the limit is 50 ms before synchronization error becomes noticeable to a viewer. Using the above example, target and host OS's time will have drifted apart more than 50 ms after about 15 hours. In this particular application, the error might not be noticeable by a user since it is rare to have such long playing time. However, there could be other applications that require tighter time tolerance.

In one or more implementations, the quantization error may be corrected by periodically correcting a net timestamp value. In making this correction, the clock provided to the target processing circuitry 132 can have a time consistent with the host processor clock 113.

In one implementation, the time drift between the time counter 120 used by the time management unit 116 and system reference time (used by host processing circuitry 112) can be corrected in a periodic fashion. For example, the interval may be set by Equation 1

$$\text{Interval}=M*1/f1=N*1/f2, \quad \text{Eq. (1)}$$

where f1 and f2 are the frequencies seen by the time management unit 116 and the host processing circuitry 112, respectively. In other words, the set time period has a duration where a number M of f1 clocks and a number N of f2 clocks occur (M and N being real numbers). At the end of every interval, the two clock frequencies f1 and f2 will match up on the rising edge.

One way to implement this may be to use a multiple of one second as the duration because there are, by definition, exactly f1 and f2 number of f1 and f2 clocks respectively within one second. In the example above, the time management unit 116 uses a clock at 224.6667 MHZ. If the interval, i.e., the set period of time, is three seconds, there will be $674\times10^6$ clock ticks during the set time period. For the same interval, there are 48 MHz×3 or $144\times10^6$ of clock ticks for a target operating at 48 MHz.

In the example above, the host had a frequency of x.666667 MHz so three seconds (or a multiple of three seconds) will allow for the clock edges to align. In other examples, the frequency might be x.25 MHz so that a multiple of four seconds is an appropriate interval or x.5 seconds so that a multiple of two seconds is an appropriate interval (or x.0 seconds so one second is an appropriate interval).

Figure 3:
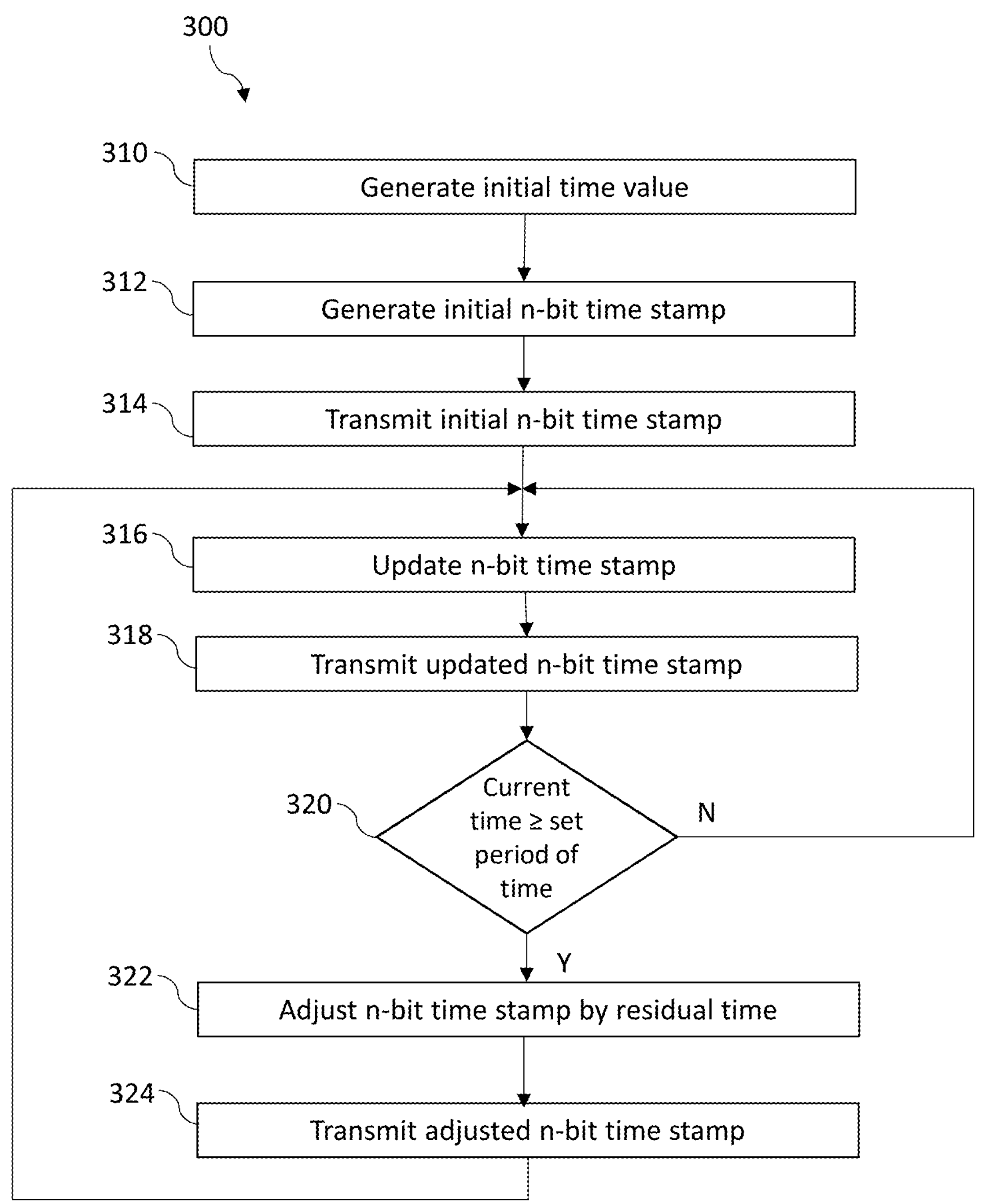
FIG. 3 is a flowchart showing an implementation of a method of the invention.

FIG. 3 illustrates a flow chart of an implementation of such a method 300. Referring to the figure, an initial time value is generated (box 310) and provided to time management unit 116. An initial in-bit time stamp can be generated from this initial time and stored in the time counter 120 (box 312). The initial timestamp can then be transmitted (box 314) from the host 110 to the target 130.

As shown in box 316, the n-bit time stamp in the time counter 120 is updated periodically and transmitted from the host 110 to the target 130 (box 318). In a typical implementation, the time counter 120 will be updated each clock cycle of the host time stamp but transmitted less frequently, e.g., every 16 μs. In other implementations, the time counter 120 can be updated less frequently, e.g. every n clock cycles where n is a real number. The transmissions can occur at any time period or aperiodically, e.g., on demand.

This cycle of updating 316 and transmitting 318 will continue for a set period of time. This period of time is determined by the specific application and can be, for example, between one and ten seconds and may be determined using Equation 1 above. In some instances, the time period can be smaller, the lower limit being determined by practical constraints in circuit design. The upper limit can be determined based upon the impact of the quantization error on the particular application. For example, in the audio/video example discussed above the time period could be hours.

When the current time reaches the set period of time (box 320), the n-bit time stamp can be adjusted by a residual time (box 322). This adjusted n-bit time stamp can then be transmitted from the host 110 to the target 130 (box 324) and will serve the updated "initial" time stamp. In various implementations, the residual time can be accumulated when updating the time stamp (box 316). In this case, updating the time stamp includes updating a main time by a time value and updating a residual time by a quantization error amount.

Figure 4:
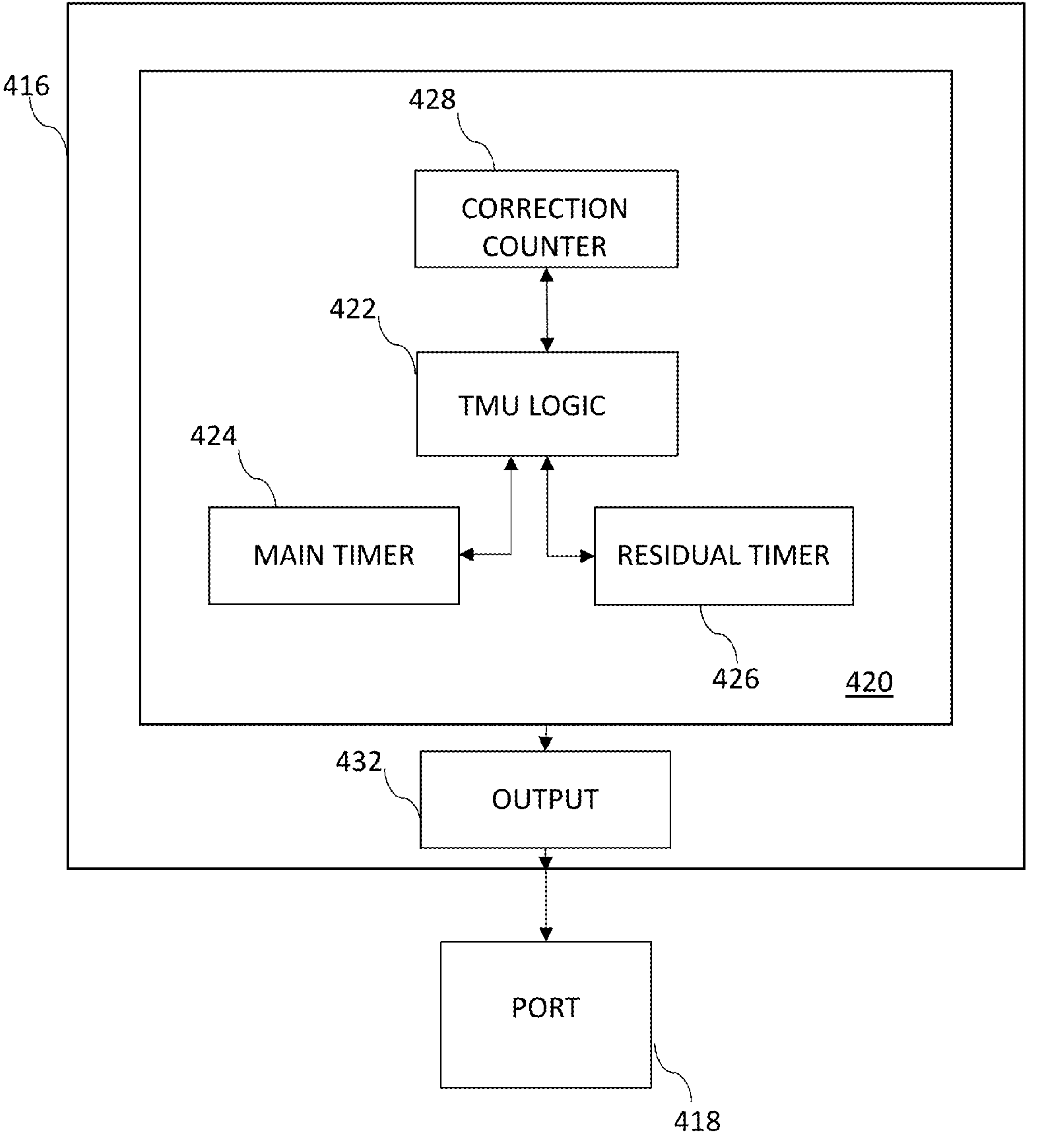
FIG. 4 is a block diagram of an implementation of a time management unit.

FIG. 4 illustrates an example of a time management unit 416 that can implement the correction discussed herein. The circuitry of FIG. 4 can be implemented as digital logic, e.g., for the main timer 424, the residual timer 426, and the correction counter 428, as well as the TMU logic 422. In one example, the TMU logic 422 is implemented as a controller and the main timer 424, the residual timer 426, and the correction counter 428 are implemented with transistors. In another example, the time management unit 416 is implemented using a processor or controller with program code to perform the various functions.

Referring to FIG. 4, to determine the correction to periodically add, the host TMU 416 may include a main timer 424 and a residual timer 426. The main timer 424 adds one clock period at every clock tick. In conjunction with the main timer 424, the residual timer 426 accumulates the error amount at each clock tick. At the set period, the total error amount or residual value from the residual timer 426 may be added to the main timer 424. This updating is controlled by TMU logic circuit 422, which utilizes a correction counter 428 in this implementation. The host TMU provides a digital output (e.g., a buffer, a driver, a latch) to provide the time stamp to port 418.

For example, a pseudo code illustrating the correction is shown below:

```
loop {if
(Correction==true) {
main_timer=main_timer clock_period [79:0]+correction_value;
}else {
main_timer=main_timer+clock_period [79:0];
}
}
correction_value=N*error;
loop {
if (correction_counter=N){
correction_counter=0;
Correction=true;
}else {
correction_counter=correction_counter+1;
Correction=false;
}
}
```

The timers 424 and 426 can be implemented as memory (e.g., utilizing five or six transistor memory cells) such as a register or a latch. In other implementations, the timers 424 and 426 may be counters or any other circuitry capable of storing the time values.

In USB 4 implementations, the main timer 424 stores 80 bits for the digital time stamp. The residual timer 426 can store between 8 bits and 32 bits for the correction value. In other implementation, a different number of bits would be stored. Timer 424 inside TMU can be implemented with an 80 bit adder. At every time tick, a value equivalent to a clock period is added to this timer. A similar adder can be used to implement the residual timer 126.

The TMU logic 422 can be implemented by digital circuitry. The digital circuitry can be combinational logic or a state machine in various implementations. For example, the timer inside the TMU is constructed with state machine and adder so it can be updated at the clock frequency rate. While this digital circuitry can utilize a processor and associated memory storing code to be executed by the processor, the processor may not be able to work quickly in implementations where the main timer is updated with each clock period.

The correction counter 428 coupled to the TMU logic 422, which is designed to increment the correction counter 428 each time the main timer 424 (and residual timer) is updated. The TMU logic 422 is designed to determine that the time correction is needed when the correction counter indicates that the set period of time period has been reached.

Figure 5:
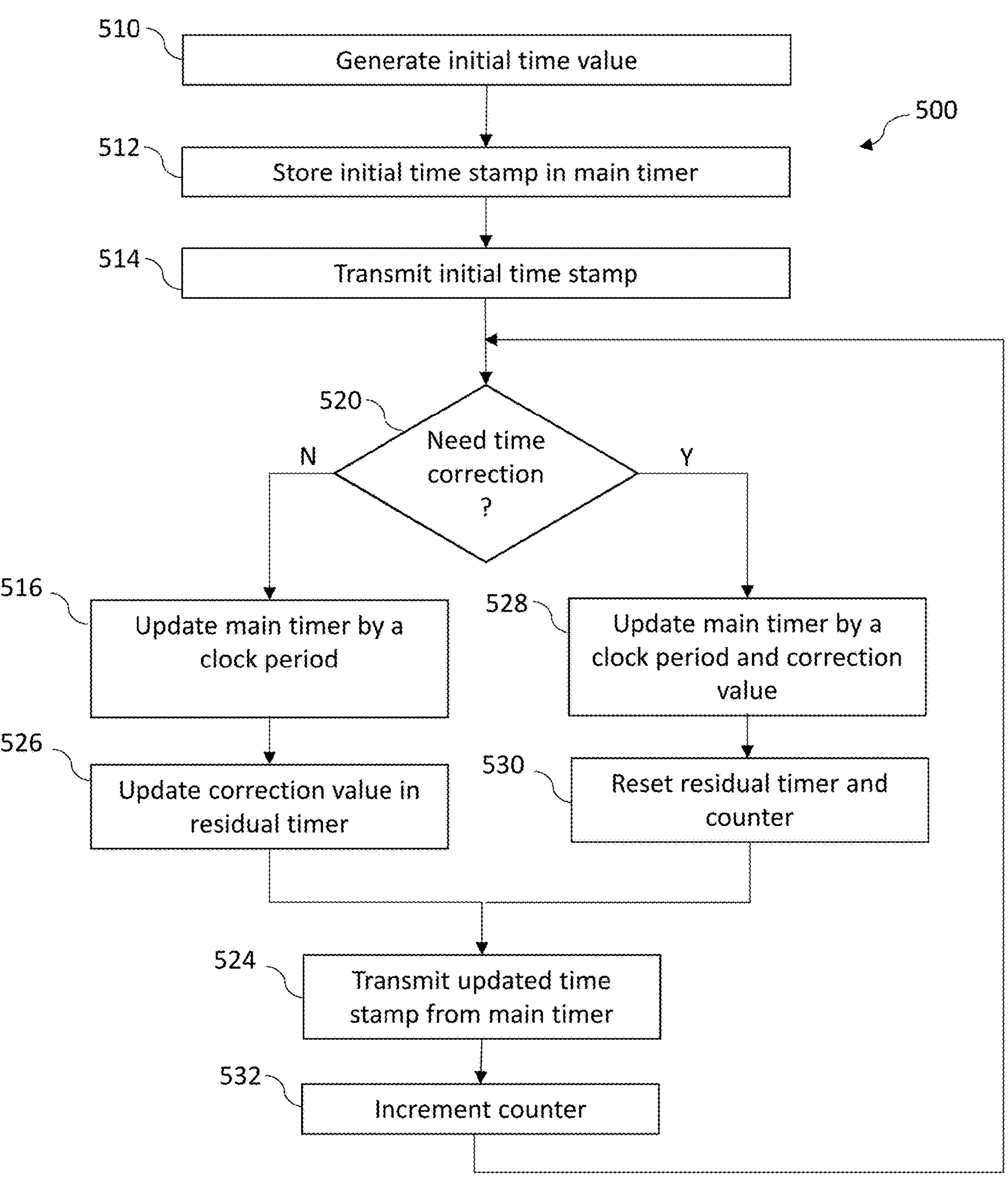
FIG. 5 is a flowchart showing an implementation of a method of the invention.

FIG. 5 provides a flow chart 500 of an implementation that utilizes the functional circuitry 100 of FIG. 1 including the time management unit 416 of FIG. 4. The initial time value is generated (box 510) and an initial time stamp is stored in the main timer 424 (box 512). For example, a digital time stamp of the host device 110 is initialized based on a system clock, e.g., clock 114, of the host device. This initial time stamp can be transmitted from the host 110 to the target 130 (box 514). At these initial steps, the residual timer 426 and correction counter 428 are set at their respective initial values (e.g., 0).

As illustrated by box 520, the TMU logic 422 can determine whether a time correction is needed based on the correction counter 428. Here the correction counter 428 is incremented until the count indicates the set period of time, e.g., between one and ten seconds as discussed above.

If no correction is needed, the main timer 424 is updated by a clock period (box 516) and the correction value is updated in the residual timer 426 (box 526). At this time, the time stamp value stored in the main timer 424 is updated by truncated value of the clock period and the correction value stored in the residual timer 426 is increased by an amount based a portion of the clock period that was truncated.

If correction is needed, the main timer is updated by a clock period and the correction value stored in the residual timer (box 528). The residual timer 426 and correction counter 428 can then be reset (box 530). At this time, the time stamp value stored in the main timer 424 is updated by the truncated value of the clock period and a value based on the correction value stored in the residual timer.

The updated time stamp from the main timer can be transmitted from the host 110 to the target 130 (box 524). After the correction counter is incremented (box 532), the process will begin again. The timing circuitry 136 at the target device 130 can recalibrate the target clock based on the digital time stamp received from the host device 110 and data can be processed by the target processing circuitry synchronously with this target clock.

As discussed above, implementations of the invention can be used in conjunction with a USB 4 time synchronization protocol. Two adjacent nodes will perform a perpetual time stamp handshake mechanism for the downstream node to determine the absolute time of the upstream host. In USB 4, the timestamp itself is made up of an 80-bit value, with the upper 64 bits being the integer portion of the time in nanoseconds and the lower 16 bits being the fractional field. Each node will increment its own time value at every clock tick. If the time period (which is 1/frequency) of the clock should happen to have a residual decimal value beyond the lower 16 bits, a quantization error will occur and can accumulate into a large error over a long period of time.

To correct this quantization error, one can add the correction back to the net timestamp value periodically. With a proper selection of interval, all or a majority of the error can be corrected. The target node will have a time consistent with the time seen by the operating system at the source node. Another benefit is the less restricted selection of sources clock frequency. Any frequency can be used which will in turn optimize the overall design cost.

For various implementations, the original main timer will still increment at every clock tick with a value of the clock. To keep track of the error, a separate residual timer will be running in conjunction with the main timer. The purpose of the residual timer is to accumulate the error amount on it every clock tick. At a periodic interval, this residual value is added back to the main timer. In an ideal case, a value N will correspond to a time period such that a decimal portion of N*1/f will not have any residual value beyond the 16-bit limit.

A number of aspects and implementations have been disclosed herein. It is understood that various ones of these can be combined as would be understood by one of skill in the art.

It is understood that the six example implementations discussed above can be combined in any combination.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. An electronic device comprising a time management unit for use in a synchronous electronic system, wherein the time management unit comprises:
- a main timer for storing a number of bits indicating a time;
- a residual timer for storing additional bits indicating lower significant digits of the time;
- digital circuitry coupled to the main timer and the residual timer; and
- a digital output designed to output time information from the main timer to a serial bus.

2. The electronic device of claim 1, wherein the digital circuitry is designed to update the main timer by a clock period and a correction value from the residual timer.

3. The electronic device of claim 2, further comprising a correction counter coupled to the digital circuitry, wherein the digital circuitry is designed to increment the correction counter each time the main timer is updated.

4. The electronic device of claim 3, wherein the digital circuitry is designed to determine that a time correction is needed when the correction counter indicates that a time period between one and ten seconds has been reached.

5. The electronic device of claim 1, further comprising a counter coupled to the digital circuitry.

6. The electronic device of claim 1, further comprising additional processing circuitry configured to generate data to be communicated with a target electronic device that will process the data synchronously with a clock that uses the time information.

7. The electronic device of claim 1, wherein the main timer is configured to store 80 bits as the number of bits indicating the time, and wherein the residual timer is configured to store between 8 bits and 32 bits as the additional bits indicating the lower significant digits of the time.

8. The electronic device of claim 7, wherein a first plurality of the 80 bits indicates the time in nanoseconds and remaining bits of the 80 bits indicate the time in fractions of nanoseconds.

9. The electronic device of claim 1, wherein the electronic device is configured to communicate the time information over the serial bus in compliance with a USB standard.

10. An electronic device comprising a time management unit for use in a synchronous electronic system, wherein the time management unit comprises:
- a main timer for storing a number of bits indicating a time;
- a residual timer for storing additional bits indicating lower significant digits of the time;
- digital circuitry coupled to the main timer and the residual timer, the digital circuitry being designed to
  - detect whether a time correction is needed,
  - in response to detecting that a time correction is not needed, update the main timer by a clock period, and in response to detecting that a time correction is needed, update the main timer by a clock period and a correction value from the residual timer; and a digital output designed to output time information from the main timer to a serial bus.

11. The electronic device of claim 10, further comprising a correction counter coupled to the digital circuitry, wherein the digital circuitry is designed to increment the correction counter each time the main timer is updated.

12. The electronic device of claim 11, wherein the digital circuitry is designed to determine that the time correction is needed when the correction counter indicates that a time period between one and ten seconds has been reached.

13. The electronic device of claim 10, further comprising a counter coupled to the digital circuitry.

14. The electronic device of claim 10, further comprising additional processing circuitry configured to generate data to be communicated with a target electronic device that will process the data synchronously with a clock that uses the time information.

15. The electronic device of claim 10, wherein the main timer is configured to store 80 bits as the number of bits indicating the time, and wherein the residual timer is configured to store between 8 bits and 32 bits as the additional bits indicating the lower significant digits of the time.

16. The electronic device of claim 10, wherein the electronic device is configured to communicate the time information over the serial bus in compliance with a USB standard.

17. An electronic device comprising a time management unit for use in a synchronous electronic system, wherein the time management unit comprises:

a main timer for storing a number of bits indicating a time;

a residual timer for storing additional bits indicating lower significant digits of the time, the additional bits representing a fractional portion of the time that is not represented in the main timer;

digital circuitry coupled to the main timer and the residual timer; and a digital output designed to output time information from the main timer to a serial bus.

18. The electronic device of claim 17, wherein the residual timer is configured to accumulate a quantization error amount at each clock tick of a clock coupled to the digital circuitry.

19. The electronic device of claim 18, wherein the residual timer is configured to:

correct the time information using the quantization error amount; and reset the quantization error amount after correcting the time information.

20. The electronic device of claim 17, wherein the digital circuitry is implemented as a state machine and an adder.

* * * * *